United States Patent
Reimann et al.

(10) Patent No.: US 7,806,352 B1
(45) Date of Patent: Oct. 5, 2010

(54) FOOD GRATER WITH POUR CONTROL

(75) Inventors: Gina Reimann, Brooklyn, NY (US); Alistair Bramley, Brooklyn, NY (US); Anthony DiBitonto, Brooklyn, NY (US); Tara Marchionna, New York, NY (US); Nicholas Oxley, New York, NY (US)

(73) Assignee: Helen of Troy Limited, St. Michael (BB)

( * ) Notice: Subject to any disclaimer, the term of this patent is extended or adjusted under 35 U.S.C. 154(b) by 44 days.

(21) Appl. No.: 12/384,140

(22) Filed: Apr. 1, 2009

(51) Int. Cl.
*A47J 43/25* (2006.01)
(52) U.S. Cl. .................... 241/93; 241/273.3
(58) Field of Classification Search ............ 241/93, 241/273.1–273.4
See application file for complete search history.

(56) References Cited

U.S. PATENT DOCUMENTS

| 4,231,527 | A | 11/1980 | Bounds |
| 4,771,955 | A | 9/1988 | Paulson |
| 5,082,190 | A | 1/1992 | Chen |
| 5,626,299 | A | 5/1997 | Haynes |
| 5,954,241 | A | 9/1999 | Huang |
| 6,247,661 | B1 | 6/2001 | Chainani |
| 6,606,939 | B1 * | 8/2003 | Tateno ......................... 99/510 |
| 6,616,075 | B1 | 9/2003 | Millerd |
| 6,766,972 | B1 | 7/2004 | Prommel et al. |
| 6,880,773 | B2 | 4/2005 | Pai |
| 7,328,865 | B1 | 2/2008 | Mills |

* cited by examiner

*Primary Examiner*—Mark Rosenbaum
(74) *Attorney, Agent, or Firm*—Seyfarth Shaw LLP

(57) ABSTRACT

A food grater having a housing, a food hopper, a reversible grating barrel removably carried by the housing and disposed at an open end of the hopper for grating food, such as cheese, contained therein, and a detachable end cap covering an open end of the grating barrel for allowing controlled dispensing of the grated food, is disclosed. A press plate configured to fit within the hopper at an open end opposite the grating barrel engages food disposed therein and moves the same into contact with the grating barrel. The detachable end cap includes concentric first and second parts, the first part including a passage defined thereon through which grated food may pass and the second part including at least two distinct areas each having an opening defined thereon, at least one of the first and second parts being movable relative to the other such that the two distinct areas of the second part may be aligned with the passage on the first part.

19 Claims, 6 Drawing Sheets

FOOD GRATER WITH POUR CONTROL

TECHNICAL FIELD OF THE INVENTION

The present device relates to a food grater. Particularly, the present device relates to a food grater which provides means for controlling the dispense of grated food.

BACKGROUND OF THE INVENTION

Graters for grating food items such as cheese and chocolate are well-known and are a commonly used item in kitchens everywhere. Such devices typically have a removable grater blade attached to a housing, such that a food item in the housing is pressed to and grated by the rotatable grater blade. The resulting grated food is then usually captured in either a housing cylinder open at one or both ends or in a separate detached container.

Where one end of the cylinder is open, the grater can be positioned over a container to allow the flow of grated food to tumble into the container. Where the housing cylinder itself is used, a hand crank typically covers one end of the cylinder, while a detachable end cap covers the other open end. Eventually, the grated food is usually then transferred en masse to a container. In either case, the process can be quite messy and grated food product can be lost in the process.

Some food graters, the housing cylinder can be used as a temporary collection and storage receptacle for grated food. In such cases, the graters may include housings that enable measurement of the grated product. The grinding and storage cylinder may even be removable from the rest of the housing. However, dispensing of the grated food has been largely ignored.

Other food grating devices are known to include additional components attached to the housing that form a handle or other means of grasping the grater. The addition of multiple components, such as a separate handle, adds to the cost and assembly time of such devices. Graters are also known to have gripping pads attached in order to aid in gripping the grating device. However, there is desired a grater which includes a housing that provides for easy gripping, grating, storing and pouring of the grated material.

The invention of this application solves these and other problems associated with prior art food graters. A food grater which is a two-in-one grater and shaker and which can be readily assembled, cleaned, and alternated between uses, is disclosed herein.

SUMMARY OF THE INVENTION

There is disclosed herein an improved food grater which avoids the disadvantages of prior devices while affording additional structural and operating advantages.

Generally speaking, a food grater is disclosed which comprises a housing, a grating barrel, a press plate, and an material dispensing end cap for the grating barrel. The housing includes a food hopper having a peripheral wall structure, while the grating barrel is carried by the housing and disposed for grating food placed in the hopper. Preferably, the barrel is closed on both ends, but at least one end is to be selectively open-able for discharge of the grated food material. The press plate is preferably configured to fit within the hopper for engagement with the food disposed therein. Finally, the end cap detachably covers an open end of the grating barrel.

In an embodiment of the claimed food grater, the detachable end cap has a first inner disc including a passage defined thereon through which grated food may pass and a second outer disc, concentric with the first disc, including at least two distinct areas each having an opening defined thereon. At least one of the first and second discs is preferably movable relative to the other such that the two distinct areas of the second disc may be aligned with the passage on the first disc.

In an embodiment of the grater, the second disc of the end cap further comprises an area which completely blocks the opening of the first disc when the two are aligned. Preferably, the opening of one of the at least two distinct areas comprise a plurality of holes defined thereon to allow discharge of the grated food material.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
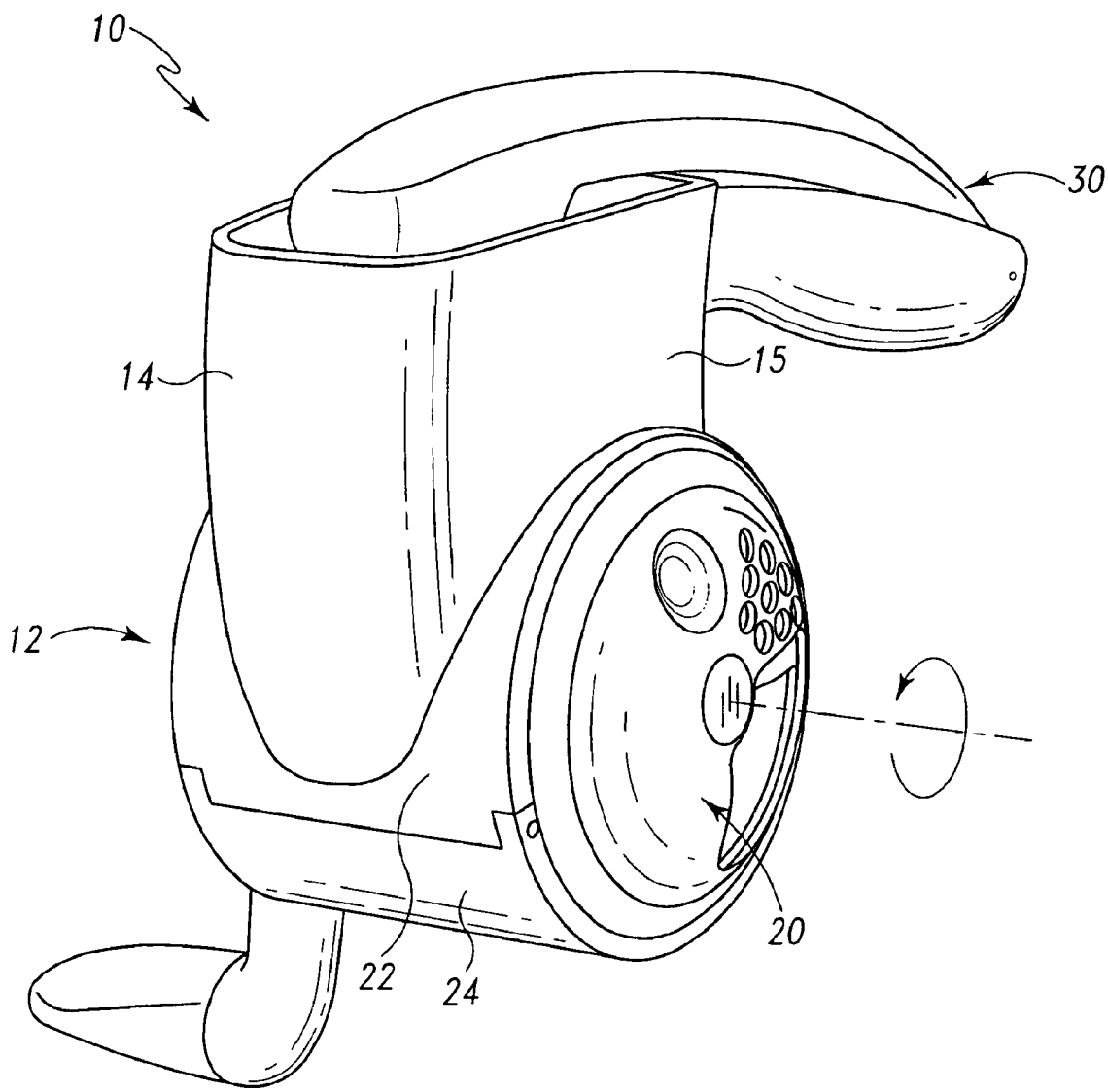
FIG. 1 is a perspective view of one embodiment of the present food grater.
Figure 2:
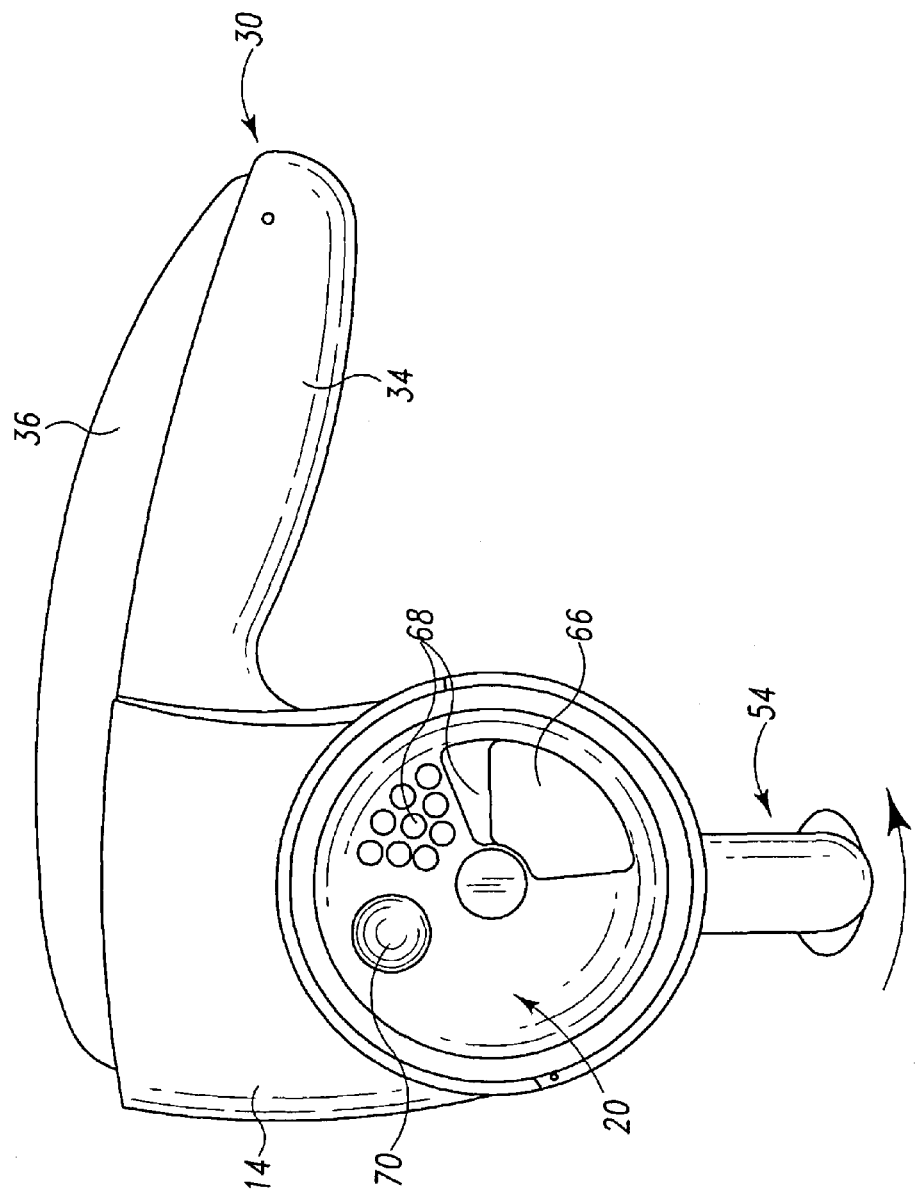
FIG. 2 is a side view of the food grater shown in FIG. 1.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-6, there is illustrated a food grater, generally designated by the numeral 10. Generally speaking, the food grater 10 includes a housing 12 with a food hopper 14, a grating barrel 16 carried by the housing 12, a press plate 18 which fits within the hopper 14, and an end cap 20 for detachably covering an open end of the grating barrel 16.

The housing 12 is preferably formed of two parts—i.e., an upper barrel casing 22 and a lower barrel casing 24—hinged to one another, as shown. The upper barrel casing 22 includes the food hopper 14 which is defined by a peripheral wall structure 15. The hopper 14 is open at both ends, a first input end 17 and a second grating end 19. The open first input end 17 is preferably wide enough to fit food items into for grating. The second grating end 19 is contoured to encase about half of the grating barrel 16, as shown.

Figure 5:
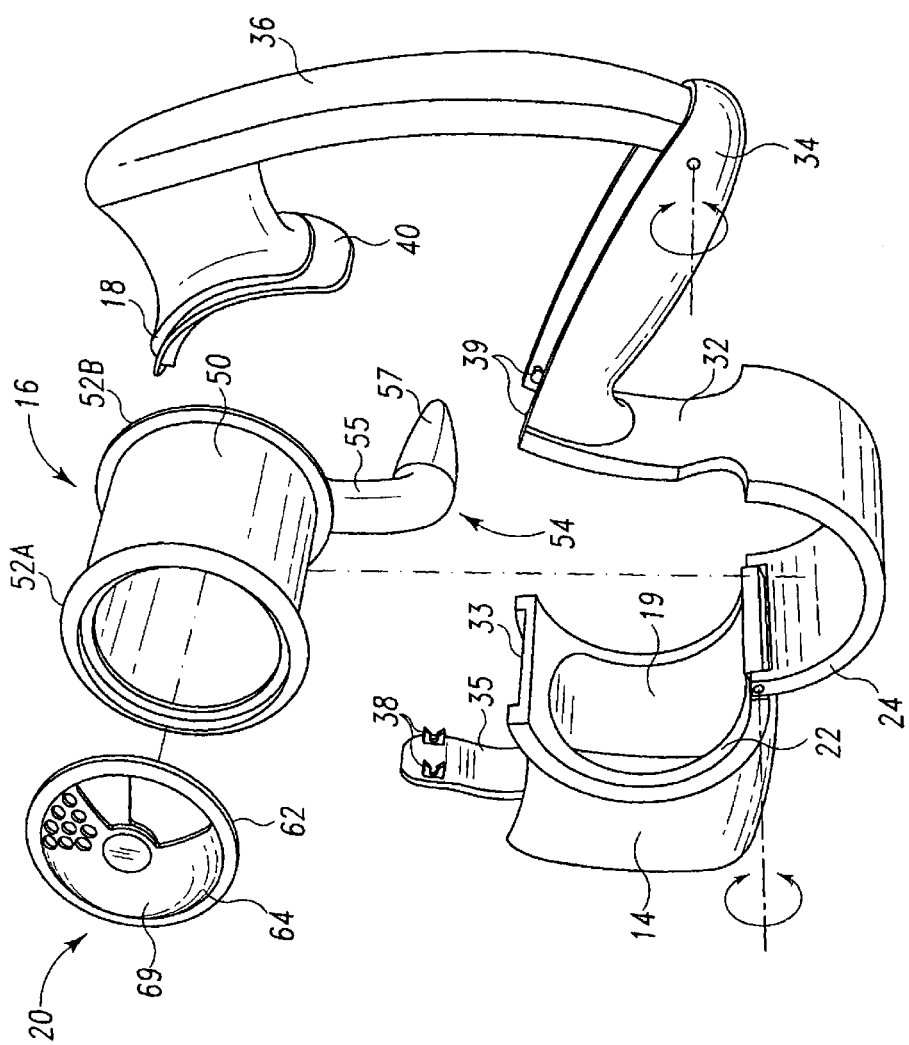
FIG. 5 is an exploded view of the food grater shown in FIG. 1.
Figure 6:
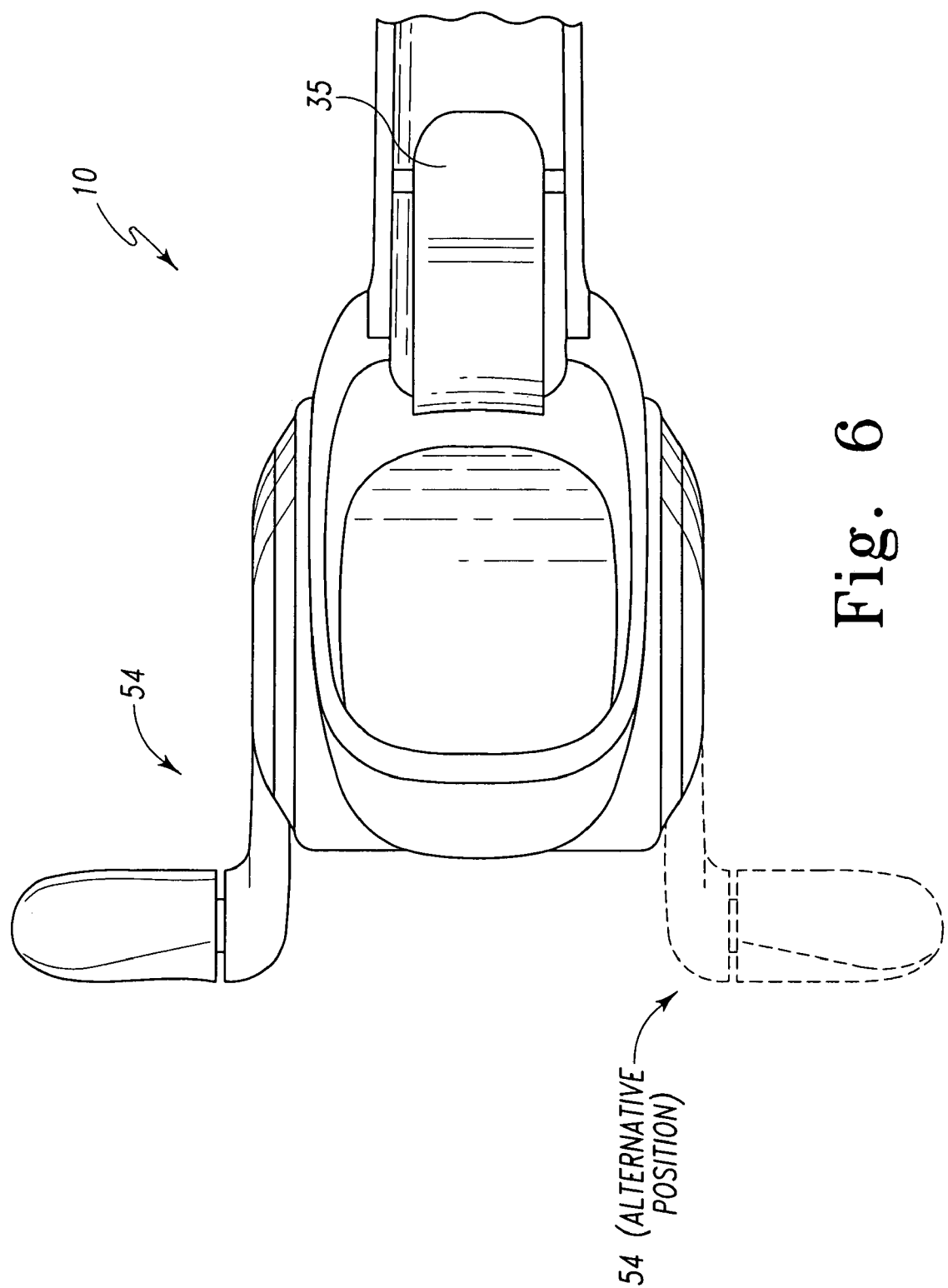
FIG. 6 is a top view of an embodiment of the food grater illustrating the reversibility of the grating barrel within the housing.

Referring to FIG. 5, it can be seen that the lower barrel casing 24 of the housing 12 is similarly contoured to encase the remaining portion of the grating barrel 16. As mentioned, the two parts are hinged together, such that the grating barrel 16 can be easily removed from the housing 12 for purposes described below.

Figure 4:
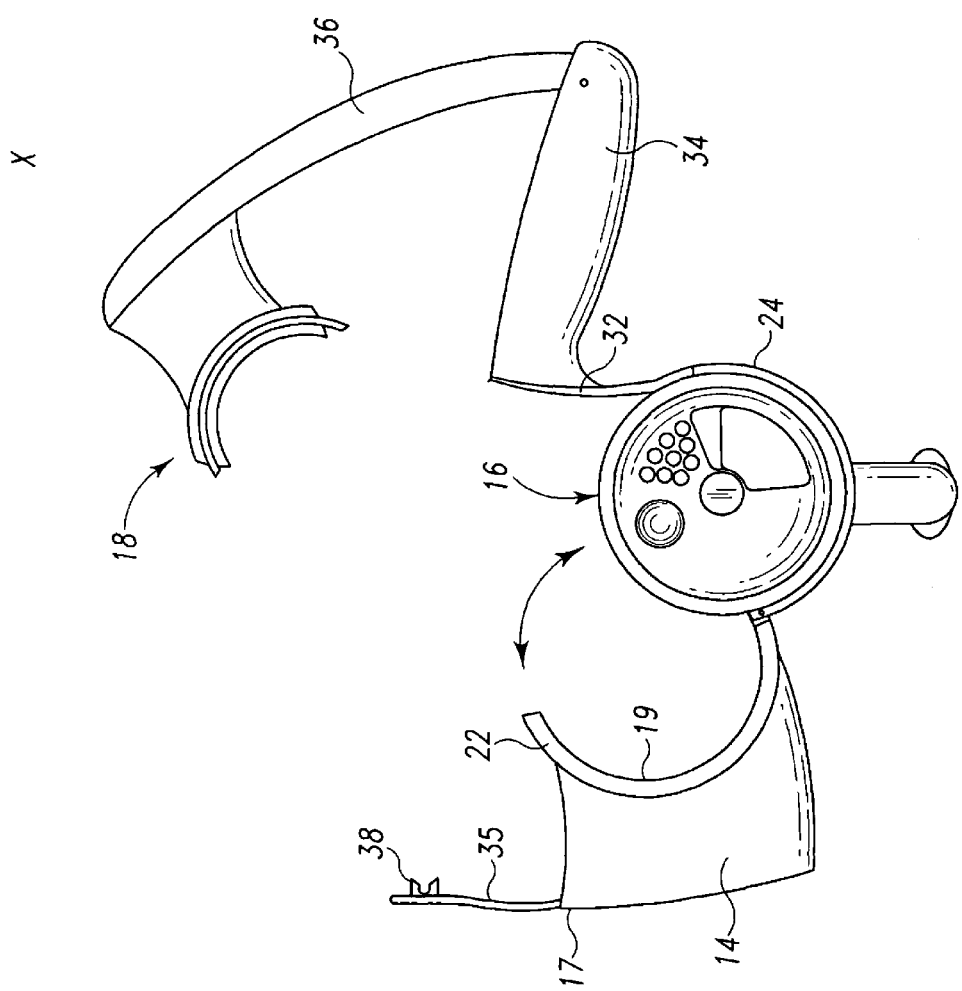
FIG. 4 is still another side view of the food grater of FIG. 3, illustrating the opening of the housing.

A two-part handle 30 is preferably attached to the lower barrel casing 24. A joining wall 32 connects the handle 30 to the lower barrel casing 24 as shown in FIG. 5. The joining wall 32 fits within a formed channel 33 within the hopper 14 when the two barrel casing parts are brought together, as shown in FIG. 4. The joining wall 32 of the housing 12 abuts a sidewall of the hopper 14 as the two barrel casing parts 22, 24 are locked together.

The grater handle 30 is also comprised of two pivoting handle segments: a first fixed segment 34 and a second free segment 36. The fixed segment 34 attaches to the joining wall 32 of the lower barrel casing 24 and extends in a direction opposite the hopper 14. To secure and hold the two barrel casing parts together in a closed position for use, a latching plate 35 may be provided—or any other suitable latching mechanism—extending from the first input end 17 of the hopper 14. As shown, clip tabs 38 are positioned on the latching plate 35 and snap about small, rounded pins 39 positioned within the body of the fixed segment 34 of the handle 30. The clip tabs 38 engage the pins 39 to lock the latching plate 35 to the fixed handle segment 34.

Figure 3:
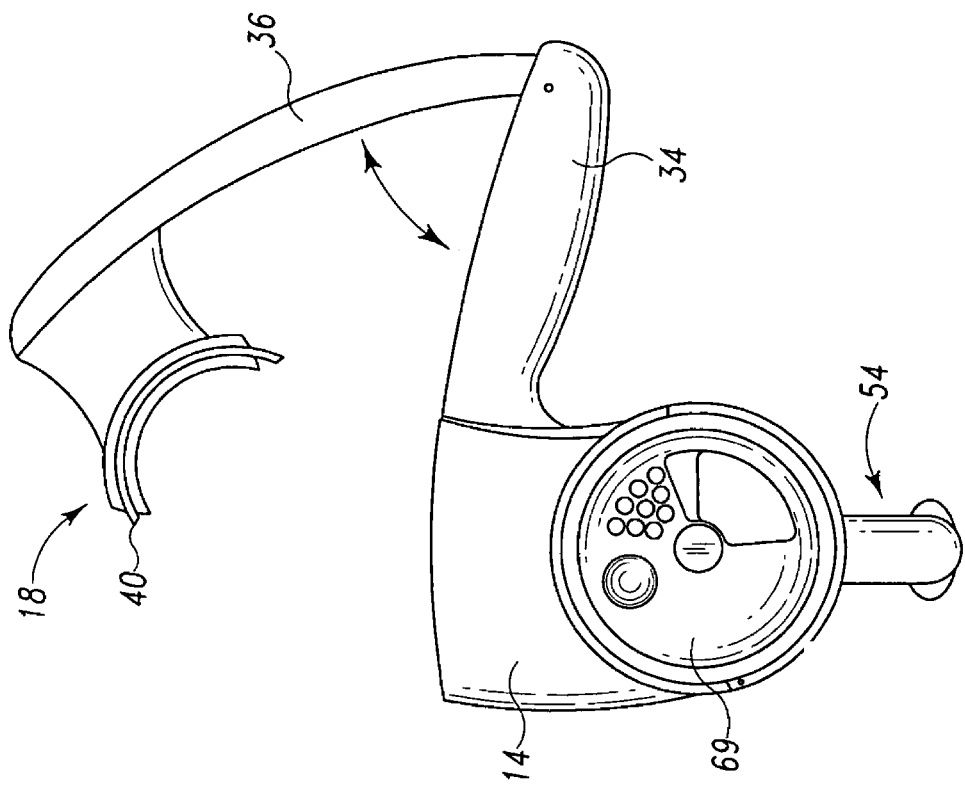
FIG. 3 is another side view of the food grater of FIG. 2, illustrating the open arm and press plate.

The press plate 18 is attached to the second free segment 36 of the handle 30, as illustrated in FIG. 3. The two handle segments 34, 36 are pinned together at one end to allow pivoting of the segments relative to one another. The pivoting movement allows the press plate 18 to be placed within the hopper 14 when the two barrel casing parts 22, 24 are closed, and further allows a continuous and uniform application of pressure by the user against food stuff within the hopper 14.

The preferred press plate 18, as shown in FIG. 3, is curved to follow the contour of the grating barrel 16. A flexible silicone (or other suitable material) gasket 40 is sonic welded between two parts of the press plate 18 to scrape against the interior of the hopper sidewalls 15. This keeps food from inadvertently exiting the hopper 14 by way of the first input end 17.

Referring now to FIG. 5, the grating barrel 16 can be more readily explained and understood. The grating barrel 16 is carried by the housing 12, specifically by being encased within the two hinged parts barrel casings 22, 24, as described above. The grating barrel 16 itself is provided with a grater blade 50 having multiple grating teeth formed thereon. In an embodiment the grater blade 50 is stainless steel and the grating teeth are stamped therein and chemically etched. Except for the following feature descriptions, the present grating barrel 16 is substantially identical to that disclosed in U.S. Pat. No. 6,766,972 to Prommel et al. and assigned to the Assignee of this application. Accordingly, the entirety of the '972 patent consistent with the present invention is incorporated herein by reference.

The grating barrel 16 has two end rings 52A-B which engage the housing 12 in a manner which allows the grater blade 50 to be turned within the housing 12. To facilitate turning of the grating barrel 16 within the housing 12, a crank 54 is provided at one open end of the barrel 16. The crank 54 includes an end cap 53, an arm 55 integral to the end cap 53, and a small rotating knob 57 extending perpendicular to the arm 55. The end cap 53 of the crank 54 is preferably permanently affixed to the barrel end 56 as shown. Of course, the crank 54 may be made to be removable to facilitate cleaning or other operations, if desired. To be removable, the end cap 53 of the crank 54 may be, for example, reverse threaded to attach to one of the fixed end rings 52A-B or use some other means known to those of skill in the art.

In an embodiment of the present invention, an end of the grating barrel 16 opposite the crank 54 is covered by a removable end cap 20. The removable end cap 20 preferably snap-fits into an end ring 52A-B, but may be alternatively threaded, keyed, or the like to attach, if desired. A silicone gasket (not shown) may be used at the attachment point of the end cap 20 to form a better seal.

The preferred removable end cap 20 is comprised of a first inner disc 62 and a second outer disc 64. The inner disc 62 includes a passage 66 defined thereon through which grated food may pass. The passage 66 is preferably less than the full area of the first inner disc 62, but sufficient to, for example, pour grated food material there through.

Rotatably attached and concentric to the first disc 62, as illustrated, is the second outer disc 64. The outer disc 64 is intended to be rotatable to allow control of the passing of grated food material through the passage 66 of the inner disc 62 by restricting the opening. To accomplish this in the present embodiment, the outer disc 64 includes at least two distinct open areas 68, each open area having a specifically sized opening (or openings) defined thereon. For example, one of the open areas may include a single large opening which approximately matches the area of the passage 66—sufficient for pouring grated food from the grating barrel 16—while another area on the outer disc 64 may include a plurality of smaller, circular openings—sufficient for sprinkling grated food from the grating barrel 16. The plurality of openings may be shaped, spaced and sized evenly or varying such parameters may be considered useful in some cases. Certainly, additional areas with varied openings sizes, shapes and numbers may also be provided.

It is also preferred that at least one closed area 69 on the outer disc 64 should be of sufficient size to completely cover the passage 66 of the first disc 62, so as to entirely prevent the discharge of grated material from the grating barrel 16. This closed area 69 setting would be useful during the grating of food material.

As noted, the outer disc 64 is preferably movable relative to the first disc 62 such that the distinct areas 68 of the outer disc 64 may be aligned with the passage 66 on the first disc 62. A perceptible finger grip 70 may also be molded into the outer disc 64 to facilitate rotation of the disc by the user. The finger grip 70, while shown to be a slight depression in the surface, may be raised such as a rib, a textured area, or some combination of such elements.

Materials

The majority of the present food grater 10 is molded from a strong, rigid material such as an acrylonitrile butadiene styrene (ABS) material. Parts such as the fixed handle segment 34, free handle segment 36, and crank knob 57 are preferably molded ABS plastic with a covering of thermoplastic rubber (TPR) or elastomer (TPE) material, such as SANTOPRENE®, for a softer feel. Both inner and outer discs 62, 64 of the removable end cap 20 are preferably molded of a more flexible polypropylene material. Other suitable materials known to those skilled in the art may be substituted, if desired.

Operation

The described food grater 10 is simple to use. As will be described, the grater 10 can be adapted for operation by both left- and right-handed users (see FIG. 6), and the grating barrel 16 can be used as a container to retain grated food material for later distribution.

As shown, the grating barrel 16 is placed within the housing 12 with the crank 54 positioned to one of either the left or right side of the grater 10. The latching plate 35 locks the hinged barrel casing 22, 24 closed about the grating barrel 16 by engaging the pins 39 within the fixed handle segment 34 with the clip tabs 38. The removable end cap 20 is then attached, if not already attached, to the open end of the grating barrel 16 with the closed area 69 of the outer disc 64 covering the passage 66 of the inner disc 62.

To begin food grating, a food material such as a block of cheese is placed into the hopper 14. The free handle segment 36 is then pivoted until the press plate 18 enters the hopper and engages the cheese. With the appropriate user's hand (not shown) placed on the knob 57 of the crank 54 and the other of the user's hands gripped about the two hinged handle segments 34, 36, the crank 54 is turned in a grinding direction. A modicum of force by the user to squeeze the two handle segments 34, 36 together forces the press plate 18 further into the hopper 14 resulting in the cheese aggressively contacting the grating blade 50. As the blade 50 grates, the cheese is captured and retained within the currently sealed barrel 16. When a sufficient amount of cheese is retained, the grating may be stopped.

To discharge the grated cheese, the user may turn the outer disc 64 of the end cap 20 using the finger grip 70 until a desired opening 68 is aligned with the passage 66 of the inner disc 62. At this point, by tilting the grater 10, the grated cheese may be appropriately dispensed. Alternatively, the grating barrel 16 may be removed from the housing 12 before opening the barrel 16 and dispensing the grated cheese.

Where the grating barrel 16 is utilized for storage of the grated food, additional grating barrels 16 may be provided and used for subsequent grating. Additionally, the grating blade 50 and the dispensing end cap 20 of each barrel 16 may be specialized for specific foods. Accordingly, as the specific food is to be grated, the particular grating barrel may be switched into use.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A food grater comprising:
   a housing comprising a food hopper having a peripheral wall structure;
   a grating barrel carried by the housing and disposed for grating food contained in the hopper, the barrel being opened on one end;
   a press plate configured to fit within the hopper for engagement with food disposed therein, and
   an end cap covering the open end of the grating barrel, the end cap having a first part including a passage defined thereon through which grated food may pass and a second part including at least two distinct areas each having an opening defined thereon, at least one of the first and second parts being movable relative to the other such that the two distinct areas of the second part may be aligned with the passage on the first part.

2. The food grater of claim 1, wherein the second part of the end cap further comprises an area which completely blocks the opening of the first part when aligned.

3. The food grater of claim 1, wherein the opening of one of the at least two distinct areas comprise a plurality of holes defined thereon.

4. The food grater of claim 1, wherein the openings of each of the at least two distinct areas comprise a plurality of holes defined thereon, the number of holes being different for each area.

5. The food grater of claim 4, wherein the diameter of the holes is different for each area.

6. The food grater of claim 1, wherein the openings of each of the at least two distinct areas comprise a plurality of holes defined thereon, the diameter of the holes being different for each area.

7. The food grater of claim 1, further comprising a rotary crank attached to an end of the grating barrel opposite the end cap.

8. The food grater of claim 1, wherein the first and second parts are concentric.

9. The food grater of claim 1, wherein the end cap is detachable from the end of the grating barrel.

10. The food grater of claim 1, wherein the housing further comprises an upper barrel casing, a lower barrel casing and a handle attached to either one of the two barrel casings.

11. The food grater of claim 10, wherein the upper and lower barrel casings are hinged together to close about the grating barrel.

12. The food grater of claim 11, wherein the grating barrel is removable from the barrel casing.

13. The food grater of claim 12, wherein the grating barrel is operatively reversible within the barrel casing.

14. The food grater of claim 13, wherein the press plate is attached to one of the two handle portions at an end opposite the adjacent ends.

15. The food grater of claim 10, wherein the handle and the food hopper are separately attached to the barrel casing.

16. The food grater of claim 10, wherein the handle is comprised of two portions connected by hinge to one another at adjacent ends, the adjacent ends being opposite an end of the handle connected to the barrel casing.

17. A food grater comprising:
   a housing comprising a food hopper having a peripheral wall structure;
   a reversible grating barrel removably carried by the housing and disposed at an open end of the hopper for grating food contained therein, the barrel being opened on one end;
   a press plate configured to fit within the hopper at an open end opposite the grating barrel, the plate being for engagement of food disposed therein, and
   a detachable end cap covering the open end of the grating barrel, the end cap having concentric first and second parts, the first part including a passage defined thereon through which grated food, may pass and the second part including at least two distinct areas each having an opening defined thereon, at least one of the first and second parts being movable relative to the other such that the two distinct areas of the second part may be aligned with the passage on the first part.

18. The food grater of claim 17, wherein the second part of the end cap further comprises an area which completely blocks the opening of the first part when aligned.

19. The food grater of claim 17, wherein the opening of one of the at least two distinct areas comprise a plurality of holes defined thereon.

* * * * *